United States Patent
Kadowaki et al.

(10) Patent No.: US 12,467,642 B2
(45) Date of Patent: Nov. 11, 2025

(54) OUTDOOR UNIT OF AIR-CONDITIONING APPARATUS

(71) Applicant: Mitsubishi Electric Corporation, Tokyo (JP)

(72) Inventors: Kimitaka Kadowaki, Tokyo (JP); Akinori Kurachi, Tokyo (JP); Naoto Ishii, Tokyo (JP); Tsukine Matsugami, Tokyo (JP); Tomoya Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 135 days.

(21) Appl. No.: 18/245,392

(22) PCT Filed: Dec. 16, 2020

(86) PCT No.: PCT/JP2020/046844
§ 371 (c)(1),
(2) Date: Mar. 15, 2023

(87) PCT Pub. No.: WO2022/130518
PCT Pub. Date: Jun. 23, 2022

(65) Prior Publication Data
US 2023/0349565 A1    Nov. 2, 2023

(51) Int. Cl.
*F24F 1/22* (2011.01)
(52) U.S. Cl.
CPC ..................................... *F24F 1/22* (2013.01)
(58) Field of Classification Search
CPC .................... F24F 1/22; F24F 11/88
USPC ................................................ 62/259.2
See application file for complete search history.

(56) References Cited

U.S. PATENT DOCUMENTS

| | | | |
|---|---|---|---|
| 9,358,917 B2 * | 6/2016 | Ikemiya | B60P 3/20 |
| 2014/0326437 A1 * | 11/2014 | Kamitani | F24F 1/22 |
| | | | 165/122 |
| 2018/0274799 A1 * | 9/2018 | Morishita | F24F 1/16 |
| 2019/0301753 A1 * | 10/2019 | Taniguchi | F24F 11/89 |
| 2020/0158354 A1 * | 5/2020 | Kurokawa | F24F 1/22 |

(Continued)

FOREIGN PATENT DOCUMENTS

| | | | |
|---|---|---|---|
| EP | 2833074 B1 * | 4/2017 | F25B 13/00 |
| EP | 3667187 A1 | 6/2020 | |
| JP | H07-324778 A | 12/1995 | |

(Continued)

OTHER PUBLICATIONS

Extended European Search Report dated Dec. 19, 2023 issued in corresponding EP Patent Application No. 20965906.9.

(Continued)

*Primary Examiner* — Steve S Tanenbaum
(74) *Attorney, Agent, or Firm* — Posz Law Group, PLC

(57) ABSTRACT

An outdoor unit of an air-conditioning apparatus, wherein the outdoor unit has a control box and an electrical box accommodated therein, in the control box, devices serving as a controller configured to control refrigeration cycle-related devices are accommodated, and in the electrical box, devices including a thermal relay are accommodated, the devices producing a smaller amount of heat compared to the devices accommodated in the control box, the electrical box being formed separately from the control box.

11 Claims, 4 Drawing Sheets

(56) References Cited

U.S. PATENT DOCUMENTS

2020/0182491 A1* 6/2020 Kurokawa ................ F24F 1/24

FOREIGN PATENT DOCUMENTS

| | | | |
|---|---|---|---|
| JP | 2925980 | B2 | 7/1999 |
| JP | 2003274683 | A * | 9/2003 |
| JP | 2011-196560 | A | 10/2011 |
| JP | 2016-201473 | A | 12/2016 |
| JP | 2019-032143 | A | 2/2019 |

OTHER PUBLICATIONS

International Search Report of the International Searching Authority mailed Jan. 19, 2021 in corresponding International Application No. PCT/JP2020/046844 (and English translation).

* cited by examiner

OUTDOOR UNIT OF AIR-CONDITIONING APPARATUS

CROSS REFERENCE TO RELATED APPLICATION

This application is a U.S. national stage application of PCT/JP2020/046844 filed on Dec. 16, 2020, the contents of which are incorporated herein by reference.

TECHNICAL FIELD

The present disclosure relates to an outdoor unit of an air-conditioning apparatus in which, for example, the outdoor unit is used as a heat source unit.

BACKGROUND ART

In recent years, from the viewpoint of safety, more stringent electrical regulations require outdoor units of air-conditioning apparatuses to be additionally equipped with a thermal relay. Normally, an outdoor unit is provided with a control box. In the control box, various types of devices that serve as a controller configured to control the air-conditioning apparatus are accommodated (for example, Patent Literature 1). In the control box, many electrical components are accommodated. Examples of the electrical components include a control substrate, an inverter, a capacitor, and a terminal.

Since this control box is operated by a worker during trial run of the air-conditioning apparatus, in general, the control box needs to be installed at a location that is easily accessible for the worker. In addition, in the control box, many heat-producing devices are accommodated, such as an inverter and a capacitor. For this reason, the control box needs to be installed at a location where the internal heat-producing devices can be sufficiently cooled by air introduced from the outside. Furthermore, in view of work efficiency for a worker and the necessity to avoid the influence of rain that rebounds from the bottom side of the outdoor unit, the control box needs to be positioned at a given height or more from the installation surface of the outdoor unit.

CITATION LIST

Patent Literature

Patent Literature 1: Japanese Unexamined Patent Application Publication No. 2011-196560

SUMMARY OF INVENTION

Technical Problem

In a case where an outdoor unit is additionally equipped with a thermal relay, it is conceivable in general that the thermal relay is also accommodated in the control box along with various types of electrical components. However, there are many electrical components accommodated in the control box. Accordingly, it is difficult to additionally accommodate the thermal relay in the control box.

It is also conceivable to increase the size of the control box to additionally accommodate the thermal relay therein. However, it is difficult to ensure a space sufficient to install the control box with an increased size at such a regular installation location as to satisfy the limitations described above.

The present disclosure has been made in view of the above problems associated with the known technique, and it is an object of the present disclosure to provide an outdoor unit of an air-conditioning apparatus in which a thermal relay can be accommodated properly in the outdoor unit without affecting the installation location of a control box.

Solution to Problem

An outdoor unit of an air-conditioning apparatus of an embodiment of the present disclosure includes a control box and an electrical box accommodated therein, in the control box, devices serving as a controller configured to control refrigeration cycle-related devices are accommodated, and in the electrical box, devices including a thermal relay are accommodated, the devices producing a smaller amount of heat compared to the devices accommodated in the control box, the electrical box being formed separately from the control box.

Advantageous Effects of Invention

As described above, according to the embodiment of the present disclosure, the devices producing a smaller amount of heat are accommodated in the electrical box that is formed separately from the control box. With this configuration, while the control box is maintained at its installation location, additional thermal relays can be properly installed in the outdoor unit.

DESCRIPTION OF EMBODIMENTS

Figure 1:
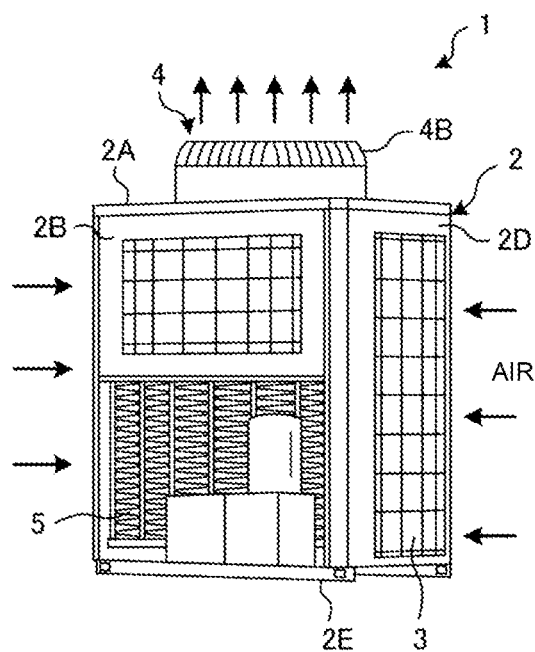
FIG. 1 is a schematic view illustrating an example of the exterior appearance of an outdoor unit of an air-conditioning apparatus according to Embodiment 1.

Hereinafter, an embodiment of the present disclosure will be described with reference to the drawings. The present disclosure is not limited to the embodiment described below, and can be variously modified without departing from the scope of the present disclosure. In addition, the present disclosure includes all combinations of configurations that can be combined among the configurations shown in the embodiment described below. The shape, size, location, and other factors of the constituent components described in each of the drawings may be appropriately changed within the scope of the present disclosure.

In the descriptions below, terms that represent directions (for example, "up," "down," "right," "left," "front," and "rear") are appropriately used for the sake of easily understanding the present disclosure. However, these terms are used merely for description purposes, and the present disclosure is not limited by these terms. In the embodiment described below, the terms such as "up," "down," "right," "left," "front," and "rear" are used in a state where the installation plate is viewed from the front. Note that the relative relationship of sizes of the constituent components, the shapes of the constituent components, and the like in the drawings may differ from those of actual ones.

Embodiment 1

An outdoor unit of an air-conditioning apparatus according to the present Embodiment 1 is described below. The outdoor unit according to the present Embodiment 1 is connected to an indoor unit by a heat medium pipe to allow a heat medium such as water or brine to circulate through the heat medium pipe. This outdoor unit is used as, for example, a heat source unit of a heat pump device.

Structure of Outdoor Unit 1

Figure 2:
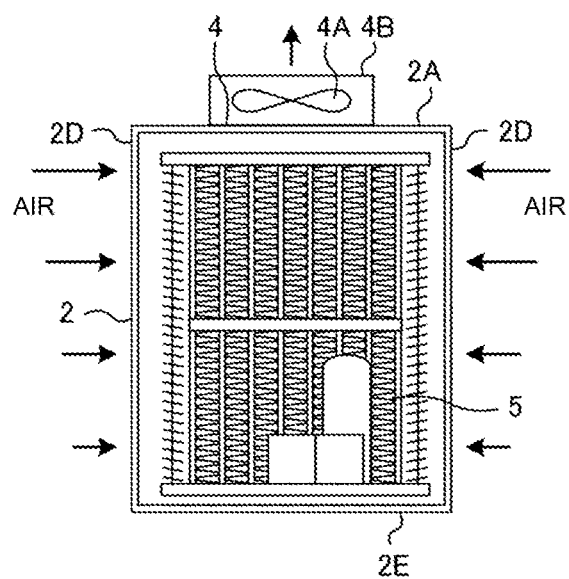
FIG. 2 is a schematic cross-sectional view of the outdoor unit in FIG. 1 when viewed in the direction from the front.
Figure 3:
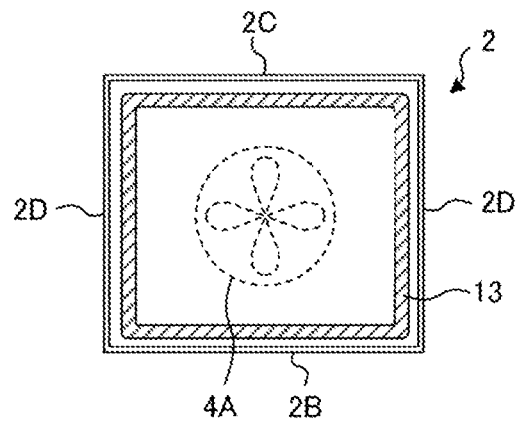
FIG. 3 is a schematic cross-sectional view of the outdoor unit in FIG. 1 when viewed in the direction from the top.

FIG. 1 is a schematic view illustrating an example of the exterior appearance of the outdoor unit of an air-conditioning apparatus according to the present Embodiment 1. FIG. 2 is a schematic cross-sectional view of the outdoor unit in FIG. 1 when viewed in the direction from the front. FIG. 3 is a schematic cross-sectional view of the outdoor unit in FIG. 1 when viewed in the direction from the top. Note that FIG. 1 omits illustrations of a lower portion of a front panel 2B for the sake of easily understanding the internal structure of the outdoor unit 1. FIGS. 1 and 2 schematically illustrate various types of devices provided inside the outdoor unit.

As illustrated in FIGS. 1 to 3, the outdoor unit 1 is formed into, for example, a cuboid shape, and the outer shell of the outdoor unit 1 is made up of a housing 2. The housing 2 is made up of a top panel 2A, a front panel 2B, a rear panel 2C, two side panels 2D, and a bottom panel 2E. The bottom panel 2E also serves as a drain pan through which drain water, and rain water or other liquid having entered the inside of the outdoor unit 1 is discharged to the outside. Note that the drain pan is not limited to this example, and may be provided separately from the bottom panel 2E as another example.

Suction ports 3 are provided on the front panel 2B, the rear panel 2C, and the two side panels 2D to introduce the outside air through the suction ports 3. At least one of the surfaces defined by the front panel 2B, the rear panel 2C, and the two side panels 2D is used as a work surface when a worker performs maintenance work. In this example, the surface defined by the front panel 2B is used as the work surface.

The front panel 2B, the rear panel 2C, and the two side panels 2D are provided along the peripheral edge portion of the bottom panel 2E, extending upward from the bottom panel 2E. The top panel 2A is provided on top of these panels. A discharge port 4 is provided on the top panel 2A to discharge air in the outdoor unit 1 to the outside through the discharge port 4. The discharge port 4 is made up of a fan 4A that serves as a discharge mechanism, and a fan guard 4B provided to cover the fan 4A and its surroundings. A heat-source-side heat exchanger 5 is provided at the peripheral edge portion on three sides of the bottom panel 2E, other than one side near the front panel 2B, such that the heat-source-side heat exchanger 5 extends along the rear panel 2C and the two side panels 2D.

Internal Structure of Outdoor Unit 1

Figure 4:
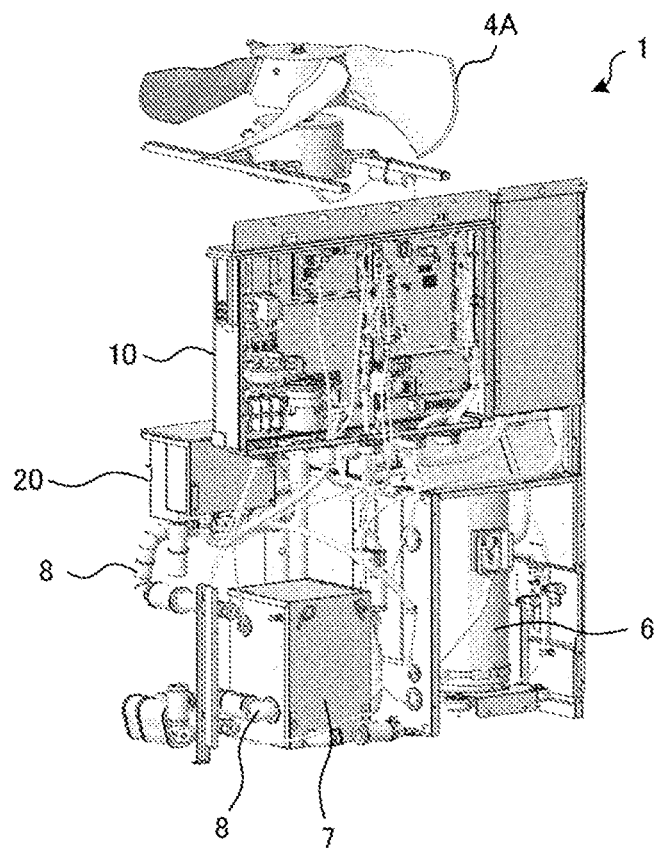
FIG. 4 is a schematic view illustrating an example of the internal structure of the outdoor unit according to Embodiment 1.

Next, the internal structure of the outdoor unit 1 is described. FIG. 4 is a schematic view illustrating an example of the internal structure of the outdoor unit according to the present Embodiment 1. Note that for the sake of easily understanding the internal structure of the outdoor unit 1, FIG. 4 omits illustrations of the housing 2 and devices which do not need to be described.

In the housing 2 of the outdoor unit 1, various types of refrigeration cycle-related devices are accommodated. Examples of the refrigeration cycle-related devices include a compressor 6 that compresses refrigerant, a pressure reducing device (not illustrated) that reduces the pressure of refrigerant, and a water heat exchanger 7 that exchanges heat between the refrigerant and the heat medium. These devices, including the compressor 6, the heat-source-side heat exchanger 5, the pressure reducing device, and the water heat exchanger 7, are connected by a refrigerant pipe to allow the refrigerant to circulate through these devices. This refrigerant pipe is also accommodated in the housing 2. A heat medium pipe 8 through which the heat medium circulates is connected to the water heat exchanger 7. The heat medium pipe 8 is also accommodated in the housing 2. The outdoor unit 1 has a control box 10 and an electrical box 20 accommodated therein.

Control Box 10

In the control box 10, electrical components are accommodated. The electrical components serve as a controller configured to control the refrigeration cycle-related devices such as the compressor 6 and the pressure reducing device provided in the air-conditioning apparatus including the outdoor unit 1. Examples of the electrical components accommodated in the control box 10 include a control substrate, an inverter, a capacitor, and a terminal.

Since the control box 10 is operated by a worker during trial run of the air-conditioning apparatus, the control box 10 needs to be installed at a location that is easily accessible for the worker. In the control box 10, many heat-producing devices such as an inverter and a capacitor are accommodated. The heat-producing devices produce a relatively large amount of heat and thus need heat dissipation means. Accordingly, it is necessary to position the internal heat-producing devices at a location where they can be sufficiently cooled. Furthermore, in consideration of work efficiency for a worker, the influence of rain that rebounds from the bottom panel 2E, and other factors, the control box 10 needs to be installed at a given height or more from the bottom panel 2E. Therefore, in the outdoor unit 1 according to the present Embodiment 1, the control box 10 is installed, extending along the front panel 2B that is a panel as the work surface, while being installed at a given height or more from the bottom panel 2E.

Electrical Box 20

Figure 5:
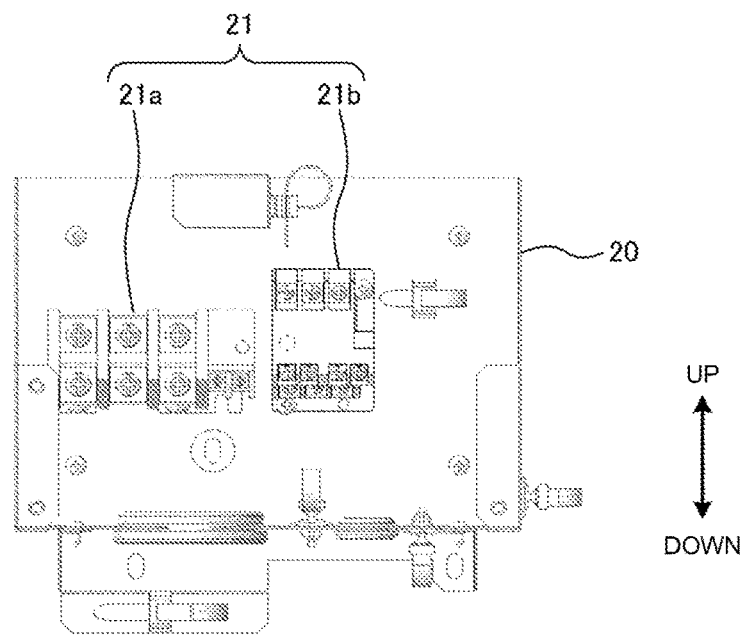
FIG. 5 is a schematic view illustrating an example of the internal configuration of an electrical box in FIG. 4.

FIG. 5 is a schematic view illustrating an example of the internal configuration of the electrical box in FIG. 4. As illustrated in FIG. 5, thermal relays 21 are accommodated in the electrical box 20. In this example, two thermal relays 21a and 21b are accommodated in the electrical box 20.

The thermal relays 21 are provided to protect motors from burnout caused by an overcurrent flow due to an overload on the motors or other reasons. In the outdoor unit 1 according to the present Embodiment 1, motors are mounted in the compressor 6 and the fan 4A. The thermal relays 21 are provided to protect these motors from burnout. Note that the outdoor unit 1 of an air-conditioning apparatus uses a plurality of rotational elements with different capacities, such as the compressor 6 and the fan 4A. In view of that, preferably a plurality of thermal relays 21 are provided corresponding to the individual rotational elements.

In the electrical box 20, devices that produce a relatively small amount of heat, including the plurality of thermal relays 21, as well as devices that do not need regular maintenance are accommodated. The "devices that produce a relatively small amount of heat" refer to a device that does not need heat dissipation means. Examples of the device include a device that produces a smaller amount of heat and thus does not need to be cooled by a heatsink, compared to the electrical components accommodated in the control box 10 such as an inverter and a variable voltage regulator.

Figure 6:
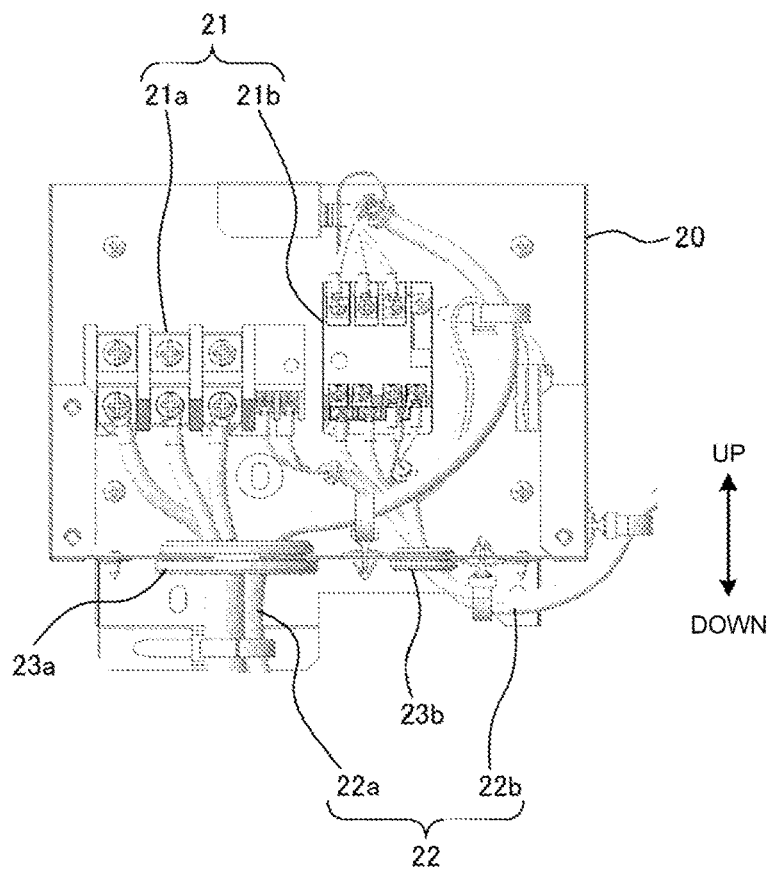
FIG. 6 is a schematic view illustrating an example of the connection state of wires to the electrical box in FIG. 5.

FIG. 6 is a schematic view illustrating an example of the connection state of wires to the electrical box in FIG. 5. As illustrated in FIG. 6, a plurality of electric wires 22 are connected to the devices accommodated in the electrical box 20. These electric wires 22 are connected from the lower side of the electrical box 20. This can prevent rain water or other liquid from entering the electrical box 20 via the wires.

The electric wires 22 include a first electric wire 22a that is a power wire, and a second electric wire 22b other than the power wire. On the lower side of the electrical box 20, a first wire connection port 23a and a second wire connection port 23b are formed. The first wire connection port 23a is a connection port for the first electric wire 22a. The second wire connection port 23b is a connection port for the second electric wire 22b.

In the present Embodiment 1, the connection ports for the electric wires 22 are provided in such a manner as to separate the connection port for a power wire from the connection port for a wire other than the power wire. This can reduce the likelihood of improper wiring at the time of manufacturing the outdoor unit 1. This also helps a worker to easily distinguish between the wires during on-site work.

Preferably, the electrical box 20 is installed between motor-mounted devices, for example, between the compressor 6 and the fan 4A. This allows the compressor 6 and the fan 4A to be connected to the electrical box 20 with a shortest distance between them, so that the length of the wire can be minimized and work efficiency for a worker can be improved.

When refrigerant leaks in the outdoor unit 1, the refrigerant is stagnant in the lower portion of the outdoor unit 1. The reason for this is that the refrigerant is heavier than air. Accordingly, when flammable refrigerant is used as the refrigerant, the electrical box 20 is installed at a height equal to or greater than the set height of approximately 50 mm from the installation surface of the outdoor unit 1 to prevent the occurrence of fire caused by the stagnant refrigerant.

As described above, in the electrical box 20, devices that produce a relatively small amount of heat and thus do not need heat dissipation means are accommodated. As the devices do not need heat dissipation means, these devices do not need regular maintenance. Consequently, the electrical box 20 does not need to be installed at a location that is accessible for a worker. For example, the electrical box 20 may be installed at a location where it is difficult for a worker to see the work spot during work and where it is difficult to access the electrical box 20.

Figure 7:
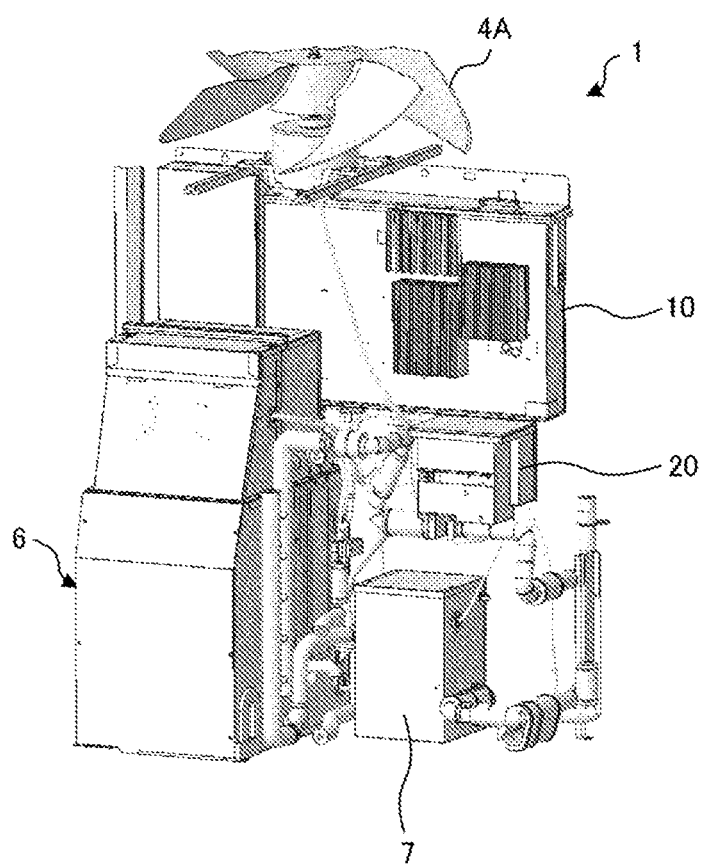
FIG. 7 is a schematic view illustrating an example of the internal structure of the outdoor unit in FIG. 1 when viewed from the rear.

FIG. 7 is a schematic view illustrating an example of the internal structure of the outdoor unit in FIG. 1 when viewed in the direction from the rear. As illustrated in FIG. 7, for example, the electrical box 20 may be installed at such a location that the electrical box 20 extends along the rear panel 2C facing the front panel 2B that is a panel as the work surface, or may be installed on the back side (rear side) of a compressor box in which the compressor 6 is accommodated or on the back side (rear side) of the control box 10 when viewed from the front side.

The devices that do not need regular maintenance are accommodated in the electrical box 20. Accordingly, there are no limitations on the installation location of the electrical box 20, so that the electrical box 20 can be installed at a location where it is difficult for a worker to access it. For this reason, the electrical box 20 can be installed at any location without taking the space in the outdoor unit 1 into consideration.

In the outdoor unit 1, for example, the heat medium pipe 8 is accommodated. Since a heat medium with heat circulates through the heat medium pipe 8, the temperature in the vicinity of the heat medium pipe 8 can possibly be increased compared to the temperature at other locations. In the present Embodiment 1, maintenance-free devices that produce a relatively small amount of heat are accommodated in the electrical box 20. In view of that, the electrical box 20 can still be installed even in the vicinity of the heat medium pipe 8 that can possibly heat the inside of the electrical box 20 as described above.

As having been explained in the section "Background Art," it is considered normal to accommodate a thermal relay in the control box 10 when the thermal relay is added compared to the known technique. The control box 10 needs to increase its size to accommodate the thermal relay therein. However, assuming that the control box 10 is maintained at its known installation location that satisfies the limitations on its installation, it is difficult to increase the size of the control box 10 from the viewpoint of insufficient space.

In contrast to this, in the present Embodiment 1, the plurality of thermal relays 21 are accommodated in the electrical box 20 that is formed separately from the control box 10, and the electrical box 20 is installed at a different location from the control box 10. This allows additional thermal relays to be installed in the outdoor unit 1, while the control box 10 is maintained at its installation location.

As described above, in the outdoor unit 1 of an air-conditioning apparatus according to the present Embodiment 1, devices that produce a relatively small amount of heat are accommodated in the electrical box 20 that is formed separately from the control box 10. This allows additional thermal relays 21 to be installed in the outdoor unit 1, while the control box 10 is maintained at its installation location.

In the outdoor unit 1, the electric wires 22 for the devices accommodated in the electrical box 20 are connected from the lower side of the electrical box 20. This can prevent rain water or other liquid from entering the electrical box 20 via the electric wires 22.

In the outdoor unit 1, the electrical box 20 includes the first wire connection port 23a that is a connection port for the first electric wire 22a, and the second wire connection port 23b that is a connection port for the second electric wire 22b. As described above, the connection ports for the electric wires 22 are provided in such a manner as to separate the connection port for a power wire from the connection port for a wire other than the power wire. This can reduce the likelihood of improper wiring at the time of manufacturing the outdoor unit 1, and can help a worker to easily distinguish between the wires during on-site work.

In the outdoor unit 1, the electrical box 20 is installed between the compressor 6 and the fan 4A, each of which has a motor mounted therein. This allows the compressor 6 and the fan 4A to be connected to the electrical box 20 with a shortest distance between them, so that the length of the wire can be minimized and work efficiency for a worker can be improved.

In the outdoor unit 1, the electrical box 20 is installed at a height equal to or greater than the set height from the installation surface. This can prevent the occurrence of fire caused by stagnant refrigerant when the refrigerant leaks.

In the outdoor unit 1, the electrical box is installed in the vicinity of the heat medium pipe 8. The devices that do not need heat dissipation means or regular maintenance are accommodated in the electrical box 20. Therefore, the electrical box 20 can still be installed even in the vicinity of the heat medium pipe 8 that can possibly heat the inside of the electrical box 20.

REFERENCE SIGNS LIST

1: outdoor unit, 2: housing, 2A: top panel, 2B: front panel, 2C: rear panel, 2D: side panel, 2E: bottom panel, 3: suction port, 4: discharge port, 4A: fan, 4B: fan guard, 5: heat-source-side heat exchanger, 6: compressor, 7: water heat exchanger, 8: heat medium pipe, 10: control box, 20: electrical box, 21, 21a, 21b: thermal relay, 22: electric wire, 22a: first electric wire, 22b: second electric wire, 23a: first wire connection port, 23b: second wire connection port

The invention claimed is:

1. An outdoor unit of an air-conditioning apparatus, wherein
the outdoor unit has a control box and an electrical box accommodated therein,
in the control box, devices serving as a controller configured to control refrigeration cycle-related devices are accommodated, and
in the electrical box, devices including a thermal relay are accommodated, the devices producing a smaller amount of heat compared to the devices accommodated in the control box, the electrical box being formed separately from the control box.

2. The outdoor unit of an air-conditioning apparatus of claim 1, wherein the electrical box is installed between a compressor and a fan, the compressor and the fan being included in the refrigeration cycle-related devices.

3. The outdoor unit of an air-conditioning apparatus of claim 1, wherein
a heat medium pipe through which a heat medium circulates is accommodated in the outdoor unit, and
the electrical box is installed in a vicinity of the heat medium pipe.

4. The outdoor unit of an air-conditioning apparatus of claim 1, wherein
the thermal relay is a thermal burnout relay.

5. The outdoor unit of an air-conditioning apparatus of claim 1, wherein
electric wires for the devices accommodated in the electrical box are connected from a lower side of the electrical box.

6. The outdoor unit of an air-conditioning apparatus of claim 5, wherein
the electric wires include
a first electric wire that is a power wire, and
a second electric wire that is other than the power wire, and
the electrical box includes
a first wire connection port that is a connection port for the first electric wire, and
a second wire connection port that is a connection port for the second electric wire.

7. The outdoor unit of an air-conditioning apparatus of claim 1, wherein
all of the devices in the electrical box produce a smaller amount of heat compared to the devices accommodated in the control box.

8. The outdoor unit of an air-conditioning apparatus of claim 7, wherein
each of the devices in the electrical box produce a smaller amount of heat compared to each of the devices accommodated in the control box.

9. The outdoor unit of an air-conditioning apparatus of claim 1, wherein the electrical box is installed at a height equal to or greater than a set height from an installation surface at which a bottom panel of a housing of the outdoor unit is installed.

10. The outdoor unit of an air-conditioning apparatus of claim 9, wherein
the set height is nonzero.

11. The outdoor unit of an air-conditioning apparatus of claim 9, wherein
the set height is 50 mm.

* * * * *